United States Patent [19]
Rokadia

[11] 3,897,175
[45] July 29, 1975

[54] DAMPER APPARATUS
[75] Inventor: Abdullah M. Rokadia, Schaumberg, Ill.
[73] Assignee: DeSoto, Inc., Des Plaines, Ill.
[22] Filed: Sept. 21, 1973
[21] Appl. No.: 399,671

[52] U.S. Cl. .................................. 417/313; 417/540
[51] Int. Cl. ............................................ F04b 11/00
[58] Field of Search .......... 417/540, 542, 543, 313; 138/26; 73/199; 137/207, 593

[56] References Cited
UNITED STATES PATENTS
3,116,754  1/1964  Ferrari, Jr. ....................... 137/593 X
3,201,942  8/1965  Yamamoto ....................... 137/593 X
3,255,779  6/1966  Russell .............................. 417/543

Primary Examiner—William L. Freeh
Assistant Examiner—G. P. LaPointe
Attorney, Agent, or Firm—Dressler, Goldsmith, Clement & Gordon, Ltd.

[57] ABSTRACT

The pulsations produced by a pulsating positive displacement pump are damped by interposing in the inlet line to the pump a conduit carrying at least one upstanding open ended tube having its lower end communicating with the conduit.

5 Claims, 1 Drawing Figure

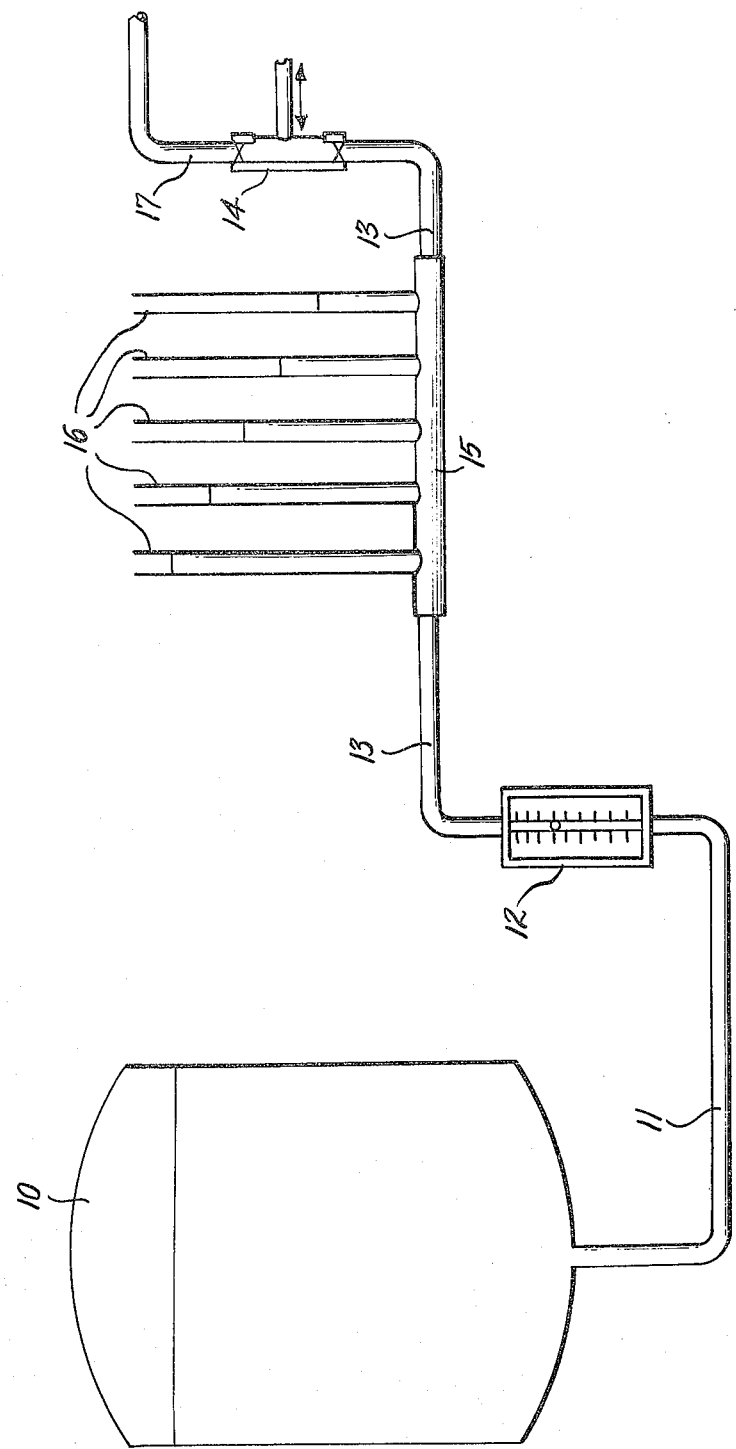

DAMPER APPARATUS

The present invention relates to damping the pulsations produced by a pulsating positive displacement pump so as to ease the burden of accurately measuring the flow rate of the pump.

It is common to the art to attempt to do this on the high pressure outlet from the pump, but the equipment needed to handle the high pressure is expensive and cumbersome.

In this invention, I interpose in the inlet line extending between a reservoir or tank and the pulsating pump, a pulsating damping device constituted by a conduit carrying a plurality of upstanding open ended tubes so that the intermittent feed to the pump is taken progressively from the tubes, leaving the flow rate through the inlet line leading to the tubes relatively uniform, enabling easy measurement using a conventional flow meter.

The flow meter and the pulsating pump are each conventional, and form no part of this invention. The pulsating pump is illustrated by a diaphragm pump in which the inlet and outlet lines are blocked by one way valves so that, as the diaphragm operates, one or the other of the valves automatically blocks the flow. In this way, the flow of liquid in the inlet line fluctuates rapidly, from zero when the pump forces liquid out of the pump outlet, to full flow when the pump is drawing liquid in through the inlet. With such large and rapid fluctuations, the quantity of liquid being pumped cannot be accurately measured.

The invention will be more fully described in the accompanying drawing in which the single FIGURE diagrammatically depicts the invention being used to measure the flow rate of liquid withdrawn from a reservoir.

In the drawing, liquid flows from reservoir 10 through feed pipe 11 and flow meter 12 to an inlet pipe 13 which is in communication with pulsating positive displacement pump 14. Before the liquid reaches the pump it passes through an interposed conduit 15 which has attached thereto a plurality of upstanding open ended tubes 16. The liquid exits on the high pressure side of the pump through outlet pipe 17.

In the absence of this invention, and as described hereinbefore, the pumping action of pump 14 causes a discontinuous flow of liquid in inlet pipe 13. The upstanding tubes 16 provide a reserve of liquid to supply liquid to the pump when it draws liquid in through the inlet. On the other hand, when the pump is discharging through outlet 17, liquid continues to flow from reservoir 10 to refill the tubes 16.

More particularly, at the time when pump 14 is not drawing liquid from inlet pipe 13, the liquid from reservoir 10 flow into tubes 16 until the level in the tubes is the same as that in the reservoir. As a result, the upper end of the tubes must extend to a height sufficient to contain the liquid flowing in conduit 15, e.g., above the height of liquid in reservoir 10. Before the flow of liquid into tubes 16 is completed, the pump starts to withdraw liquid from the inlet pipe. The burden of supplying liquid for this increased flow is shared between the inlet pipe and the upstanding tubes, with the tubes nearer the pump supplying a larger proportion of the liquid than those further away.

A fairly constant flow rate is maintained at flow meter 12. This is because liquid flows when pump 14 is not drawing liquid from pipe 13, and because the liquid flow rate is less than the full inlet rate of the pump when pump 14 is drawing liquid from pipe 13.

The present invention is also applicable to a system in which reservoir 10 is replaced by any low pressure liquid feed. In this case, the height of tubes 16 must be higher than the level which the liquid seeks when pump 14 is not in operation so that the liquid in pipe 13 is at its maximum pressure.

Tubes 16 must be upstanding to contain the liquid therein. In the preferred practice, these tubes are vertical to minimize the length of the tubes necessary to contain a given pressure of liquid. However, an upstanding nonvertical arrangement of tubes may be necessary to accommodate special space limitations, and therefore such arrangements are within the scope of this invention.

Inlet pipe 13 may be positioned at any angle, with a horizontal positioning being most convenient.

While a single upstanding tube will serve to damp the flow somewhat, it is normal to employ a plurality of upstanding tubes spaced apart along the length of said conduit, as shown in the drawing. In this way, the flow is divided between conduit 15 and an upstanding tube a plurality of times, each time producing less of a drop in the liquid level in the tube, and less of a pulsation in conduit 15.

It will be appreciated that the number of tubes and the bore size of each tube will vary with the flow requirements of any given pump system. The minimum bore and the number of tubes depends on the degree of damping desired. As a practical matter, the capacity to handle an adequate flow rate through the conduit requires that there be at least two upstanding tubes, and the total flow area of the upstanding tubes should be at least half as great, and more preferably at least 1.5 times, the flow area of the conduit. It is particularly preferred to employ at least three upstanding tubes and to have the total flow area of the upstanding tubes at least 3 times the flow area of the conduit.

As an illustration, a typical embodiment of the invention consists of five tubes, each 17 inches long and 0.25 inch inside diameter extending vertically upward from a horizontal conduit having an inside diameter of 0.25 inch, with the distance between the centerlines of each tube being 1 inch. This damper device is used with water and with the liquid level in the upstanding tubes at a height of 12 inches above the conduit when the pump is off. The pulsating pump is operated at about 8–10 pulses per minute, and provides a flow rate of about 100 ml. per minute. Up to this flow rate, the damper functions to steady the flow meter for easy reading, but as the flow rate is further increased, the fluctuations become worse, making accurate reading progressively more difficult.

The invention is defined in the claims which follow.

I claim:

1. In combination with a liquid supply and a pulsating positive displacement pump, a conduit connected to said liquid supply at its inlet end and to the pump at its outlet end, said conduit carrying a plurality of upstanding open-ended tubes communicating with said conduit at their lower ends and extending upwardly to contain the liquid flowing in said conduit when said pump is not drawing liquid through said conduit, and a flow meter interposed in the liquid supply to said conduit.

2. Apparatus as recited in claim 1 in which there are a plurality of upstanding open-ended tubes communicating with said conduit, said tubes having a total flow area which is at least half as great as the flow area of the conduit.

3. Apparatus as recited in claim 2 in which said conduit is positioned horizontally, and said tubes are vertical.

4. Apparatus as recited in claim 2 in which the total flow area of the upstanding tubes is at least 1.5 times the flow area of the conduit.

5. Apparatus as recited in claim 1 in which there are at least three upstanding tubes communicating with said conduit, said tubes having a total flow area which is at least three times the flow area of the conduit.

* * * * *